(No Model.)

D. CARRIER.
MACHINE FOR GRINDING THE TEETH OF HARVESTER SICKLES.

No. 485,607. Patented Nov. 8, 1892.

Witnesses:   Inventor.

UNITED STATES PATENT OFFICE.

DAVID CARRIER, OF FOND DU LAC, WISCONSIN.

MACHINE FOR GRINDING THE TEETH OF HARVESTER-SICKLES.

SPECIFICATION forming part of Letters Patent No. 485,607, dated November 8, 1892.

Application filed May 23, 1892. Serial No. 433,991. (No model.)

*To all whom it may concern:*

Be it known that I, DAVID CARRIER, a citizen of the United States, residing at Fond du Lac, in the county of Fond du Lac and State of Wisconsin, have invented a new and useful Machine for Grinding the Teeth or Knives of Harvester-Sickles, of which the following is a specification.

My invention relates to improvements in grinding-machines adapted to the sharpening of the sickle teeth or cutters of a reaper or mower; and the objects are to grind the two adjacent edges of separate teeth at the same time without detachment from the cutter-bar and to preserve the original and a uniform basil to the knives, respectively. I attain these objects by the mechanism illustrated in the accompanying drawings, in which—

Figure 1:
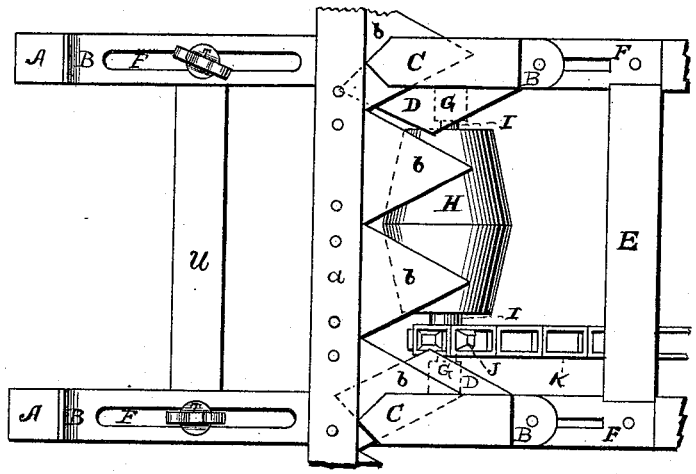
Figure 2:
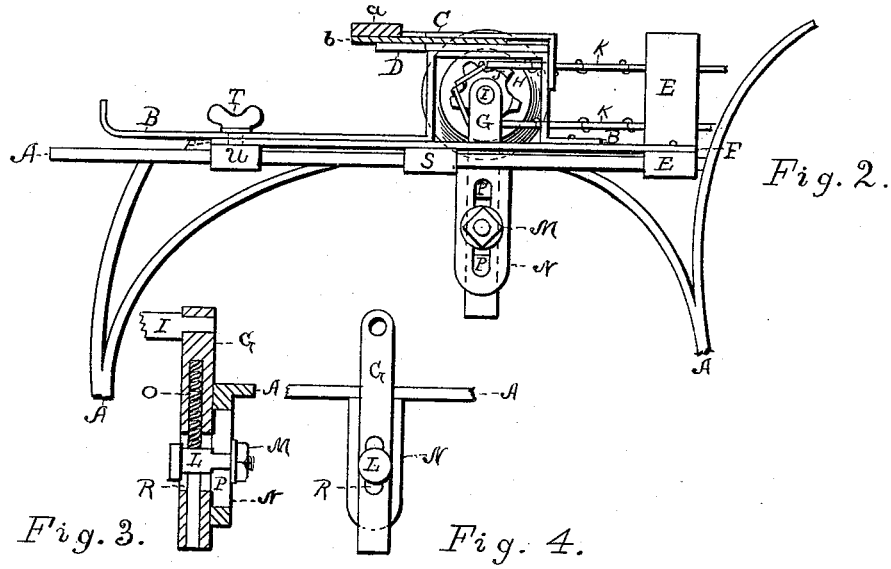
Figures 3, 4:
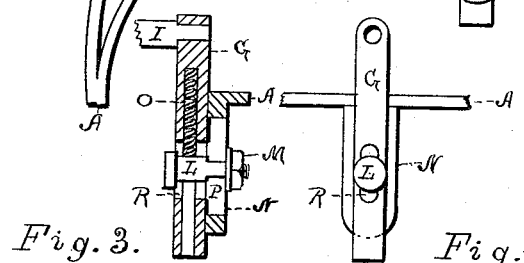

Figure 1 is a top or plan view of the machine. Fig. 2 is a side sectional elevation. Fig. 3 is a cross-sectional view of the bearing of the emery wheel or stone with its inside spring, its rest, and attachment to the shears; and Fig. 4 is an outer view of the yielding bearing of the axis of the wheel or stone.

Similar letters refer to similar parts throughout the several views.

Upon the table or shears A is mounted and supported the carriage B, which is composed of two similar and parallel bars transversely tied with plate $n$. These bars are arched in the middle, forming thereby a tool-rest, covered with guards C D, and making therewith a notch or holder on each bar at or near the center thereof. The feet of the bars or the carriage are slotted vertically. F F are the front slots, provided with a bolt and nut turned by a thumb-screw T for the purpose of adjusting and securing the carriage relatively to the grindstone, as desired, while the rear slots, with their guide-pins, secure and keep the bars in line.

The emery wheel or stone H is doubly beveled on its grinding-surface. The bevels must be uniform from its center line and be the counterpart in slope, as near as may be, of the basils of the sickle cutting teeth or knives to be ground.

The arbor I is journaled in the top of the posts G G, affixed to either side of shears A at or near the center of the bars B B. The posts are hollowed in the center vertically and provided with spiral springs O, adjustable by an upwardly-sliding head L, with nut M, and thus providing a yielding bearing for the arbor I of the emery wheel or stone H of more or less stiffness, according to its adjustment.

As shown in the drawings, the emery wheel or stone H is driven by means of a cog-wheel and chain J K K, connected with steam or other power from outside. In the absence of connecting-power I prefer to run it by pulleys or sprockets operated by treadles.

Having thus described the construction of my machine it will be apparent that the placing of the cutter-bar $a$ with its teeth $b\ b$ across the wheel H, secured on each side in the notch-rests C D, and by means of the carriage with its bolts and slots F F and thumb-screws T T, the adjacent basils of the teeth being fed to and upon the bevels of the wheel in motion, will effect a quick and accurate sharpening of the teeth or knives of the sickle. The pressure of the wheel upon the knives may be regulated, as above described, by means of the adjustable yielding bearings G O L.

Having thus described the construction and operation of my machine, I claim as my invention and desire to secure by Letters Patent—

The combination, in a sickle-grinding machine, of the carriage B, having slots F F for adjustment and guides, and arched rests and guards C D, with the emery wheel or stone H, resting on yielding bearings as to its axle I I, and doubly beveled with slopes to correspond with the basils of the teeth or knives $b\ b$ of the sickle.

DAVID CARRIER.

Witnesses:
 F. F. DUFFY,
 C. B. WHITTON.